United States Patent

[11] 3,611,913

[72] Inventor William L. McGinley
 Dallas, Tex.
[21] Appl. No. 850,870
[22] Filed Aug. 18, 1969
[45] Patented Oct. 12, 1971
[73] Assignee American Home Products Corporation
 New York, N.Y.

[54] AUTOMATIC BUN GRILL
 7 Claims, 25 Drawing Figs.
[52] U.S. Cl.................................................. 99/349,
 64/30, 99/352, 99/386, 99/393, 99/400, 99/423,
 99/443, 99/446, 118/13
[51] Int. Cl.................................................. A47j 37/08
[50] Field of Search.......................................... 126/41 C;
 99/349, 352, 355, 386, 387, 391, 390, 422, 423,
 427, 443, 448, 393; 287/2, 52.01; 64/30; 118/13

[56] References Cited
 UNITED STATES PATENTS
 2,788,735  4/1957  Farace........................ 99/423 X
  819,909  5/1906  Muller......................... 287/2
 2,244,670  6/1941  Benedict....................... 99/386 UX
 3,033,099  5/1962  Marriott....................... 99/349
 3,229,616  1/1966  Reese.......................... 99/386
 3,517,605  6/1970  Hursch et al................... 99/423

*Primary Examiner*—Billy J. Wilhite
*Attorney*—Teichert & Koprowski

ABSTRACT: A bun grill having chain conveyor means for conveying buns across the surface of a heated grill plate. The grill plate and the conveyor means are inclined from vertical so that the weight of the conveyor chains applied to the buns will hold the buns against the grill plate. On the other hand, the grill plate and conveyor means are inclined toward vertical to permit the bun grill housing to occupy a minimum of counter space. The space between the grill plate and the conveyor assembly is adjustable. The entire conveyor assembly is mounted on rods in tracks for removal of the assembly for cleaning. The grill plate is heated gradually from its upper end to its lower end to avoid sticking of the buns. A butter roll is driven by the same motor that operates the conveyor assembly. Heat from the grill plate keeps butter liquid in the butter pan so that a uniform film will always be present on the surface of the butter roll, and no additional butter heaters are required.

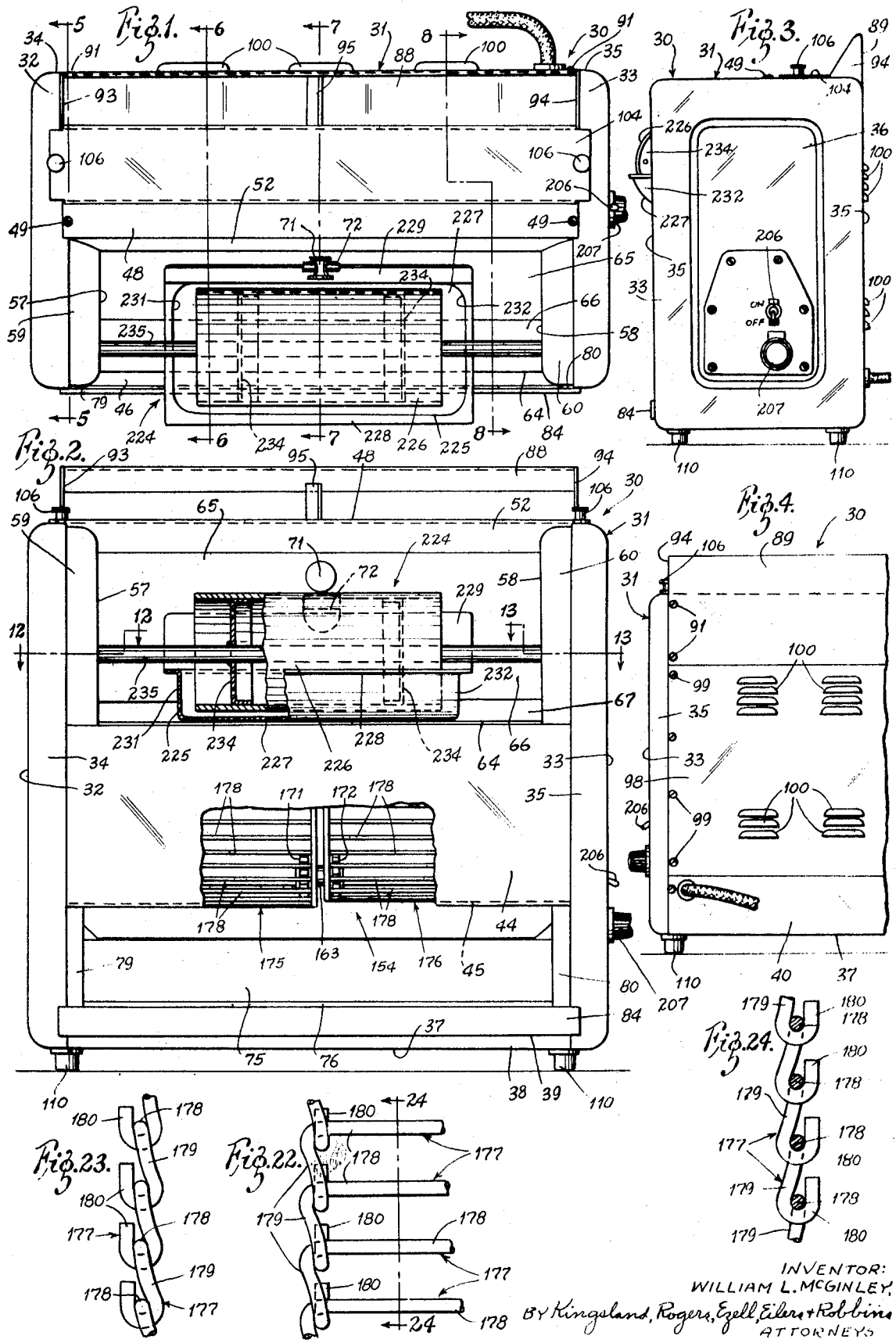

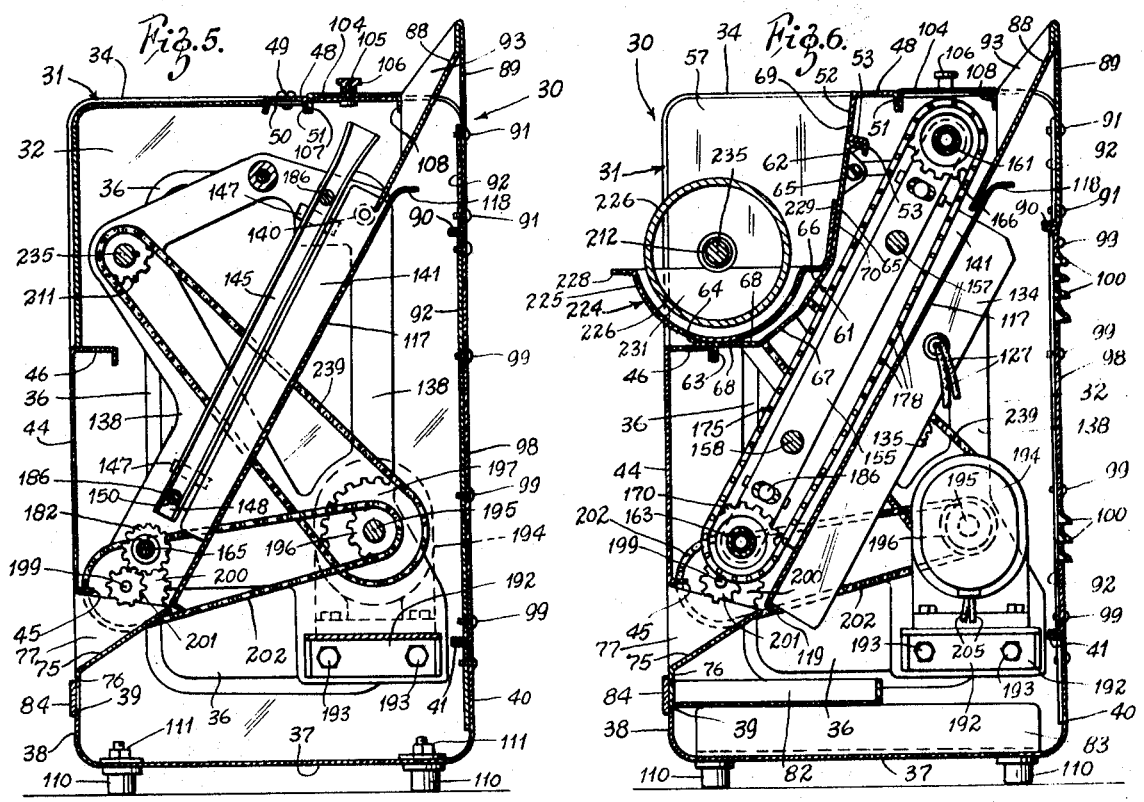

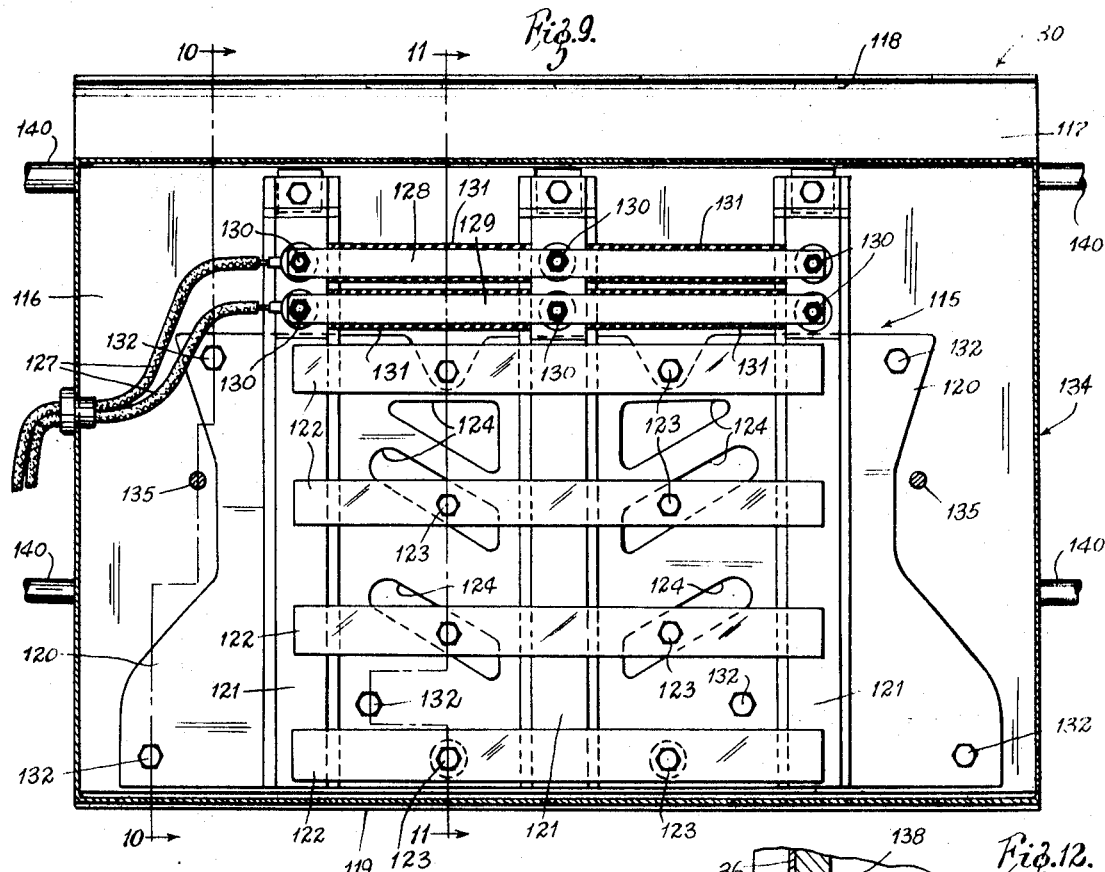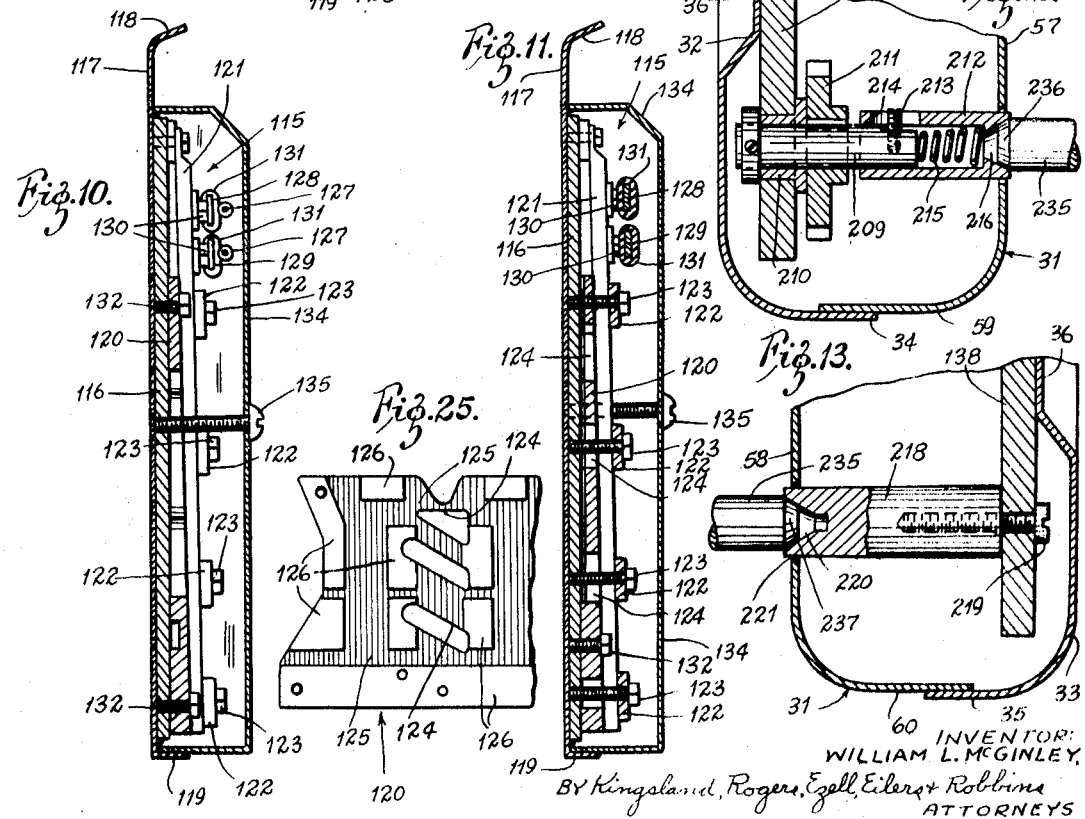

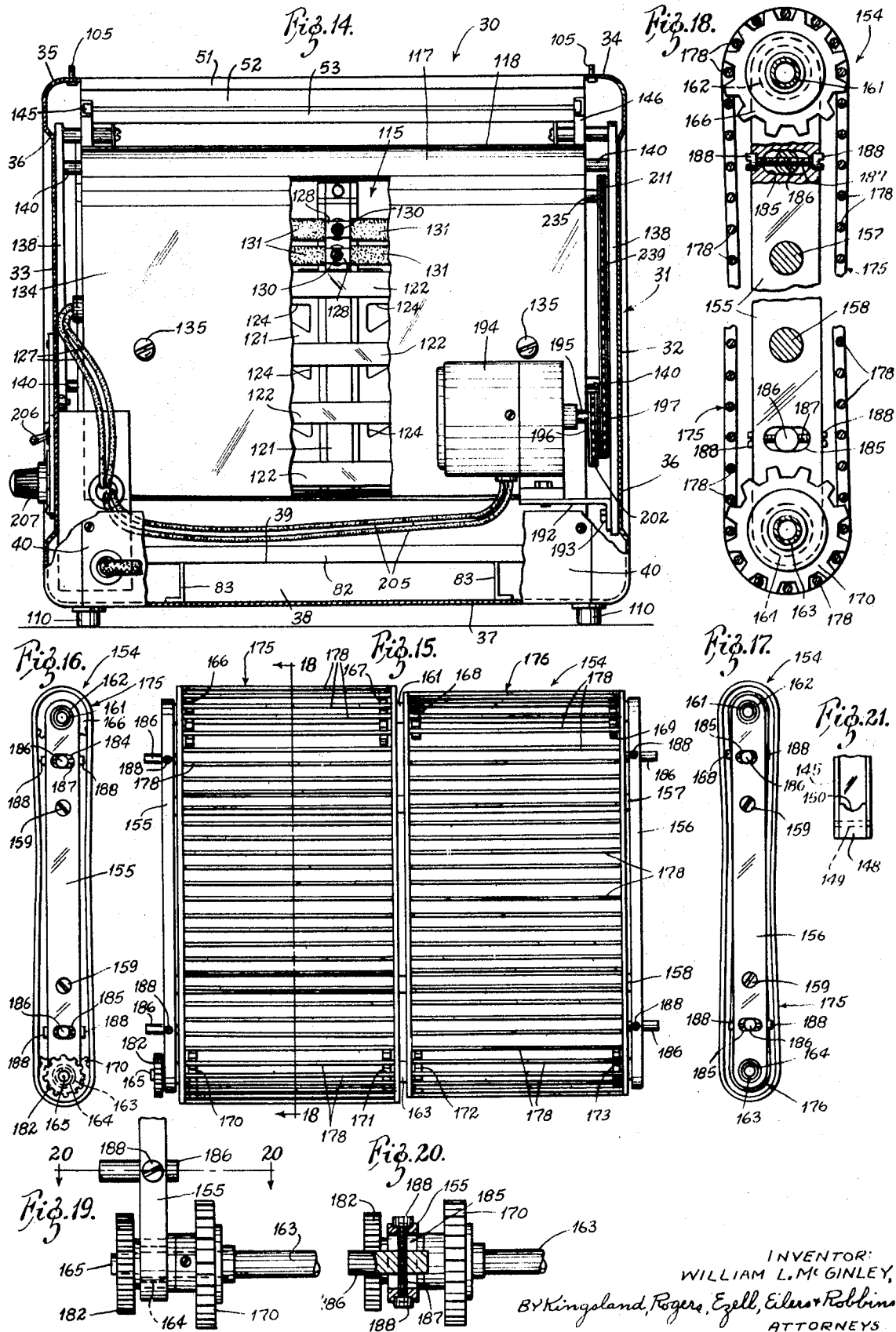

3,611,913

AUTOMATIC BUN GRILL

BRIEF DESCRIPTION OF THE INVENTION

This bun grill has a housing with various removable access panels. An inlet chute is mounted at the upper end of the housing, and an outlet chute is adjacent the lower end of the housing. A conveyor assembly is removably mounted within the housing to convey buns past a grill plate that is located between the inlet chute and the outlet chute. The conveyor assembly comprises two chain conveyors one of which moves closer to the grill plate than the other to accommodate the different thicknesses of bun tops and bottoms. The conveyor assembly is inclined so that the weight of the slack conveyor chains against the bun halves holds the bun halves in contact with the grill plate as the bun halves are moved across the grill plate.

The grill plate is heated by heating elements that transfer their heat to an aluminum casting. The aluminum casting is designed with cutouts and recesses and is shaped so that the combination produces graduated heat from the upper end toward the lower end of the grill plate. This avoids sticking of the buns to the grill plate.

A butter roll is mounted with a butter pan on the bun grill housing. The butter roll is rotated by the same motor that drives the chain conveyors. Heat from the grill plate keeps butter in the butter pan in a liquid state. The butter roll is mounted in a spring-biased bearing so that it can be removed for cleaning. The butter pan is also easily removable for cleaning.

The conveyor assembly is adjustable toward and away from the grill plate to permit the application of the desired pressure against buns that are conveyed between the conveyor assembly and the grill plate. Also, the conveyor assembly is removable as a unit for cleaning.

BRIEF DESCRIPTION OF THE DRAWINGS

FIG. 1 is a top plan view of the bun grill.

FIG. 2 is a front elevation view of the bun grill with part broken away.

FIG. 3 is a right-side elevation view of the bun grill.

FIG. 4 is a fragmentary rear elevation view of the bun grill.

FIG. 5 is a view in section on an enlarged scale taken along the line 5—5 of FIG. 1 with the motor shown in broken lines, although the motor does not really appear in FIG. 5.

FIG. 6 is an enlarged view in section taken along the line 6—6 of FIG. 1.

FIG. 7 is an enlarged view in section taken along the line 7—7 of FIG. 1.

FIG. 8 is an enlarged view in section taken along the line 8—8 of FIG. 1.

FIG. 9 is an enlarged rear elevation view, partly in section to illustrate the cooking plate.

FIG. 10 is a view in section taken along the line 10—10 of FIG. 9.

FIG. 11 is a view in section taken along the line 11—11 of FIG. 9.

FIG. 12 is an enlarged fragmentary view in section taken along the line 12—12 of FIG. 2, but with the chain omitted.

FIG. 13 is an enlarged fragmentary view in section taken along the line 13—13 of FIG. 2.

FIG. 14 is a rear elevation view with parts shown in section and with the inlet chute, the cross brace, and the chain assembly removed.

FIG. 15 is a front elevation view of the conveyor assembly.

FIG. 16 is a left-side elevation view of the conveyor assembly.

FIG. 17 is a right-side elevation view of the conveyor assembly.

FIG. 18 is an enlarged fragmentary view in section taken along the line 18—18 of FIG. 15. It should be noted that, because of the small scale, the chain construction is shown diagrammatically in FIGS. 15-18, as well as FIGS. 5-8, with actual full-scale details being shown in FIGS. 22-24.

FIG. 19 is an enlarged fragmentary front elevation view of the lower left-hand portion of FIG. 15, but with the chain omitted.

FIG. 20 is a fragmentary view in section taken along the line 20—20 of FIG. 19.

FIG. 21 is a fragmentary side elevation view of the shaft support at the lower end of the channel guide for the conveyor assembly.

FIG. 22 is a fragmentary front elevation view of a portion of the chain conveyor.

FIG. 23 is a fragmentary left-side elevation view of the chain conveyor.

FIG. 24 is a fragmentary view in section taken along the line 24—24 of FIG. 22.

FIG. 25 is an enlarged fragmentary elevation view of half of the heating plate, as viewed from the side which contacts the grill plate.

DETAILED DESCRIPTION OF THE INVENTION

The bun grill 30 has a stainless steel housing 31 that comprises several panels fastened together by welding or screws. The housing 31 is approximately 21 inches high, 12 inches deep, and 21 inches wide. There are left- and right-side panels 32 and 33 having inwardly rounded peripheral edges 34 and 35, respectively. Each side panel 32 and 33 has an inset central panel 36, as shown in FIG. 3, for added strength and rigidity. A bottom panel 37 extends between the side panels 32 and 33, and is suitably welded thereto. As shown in FIGS. 6, 7, and 8, the bottom panel 37 has an upwardly curved front extension 38 terminating in a horizontal edge 39 and an upwardly extending rearward section 40 terminating in an inwardly bent flange 41.

A front panel 44 extends between the side panels 32 and 33. The lower edge of the front panel 44 terminates in an inwardly extending flange 45 and the upper edge of the front panel 44 terminates in an inwardly and downwardly extending flange 46.

A cross brace 48 extends between the side panels 32 and 33 and is fastened by screws 49 to short tabs 50 welded to the undersides of the inner-turned peripheral edges 34 and 35 of the side panels. (See FIG. 5.) As shown in FIG. 6, the cross brace 48 has a downwardly extending rear flange 51 and a downwardly and forwardly inclined front wall 52 that leads to a rearwardly and downwardly extending flange 53. There are inner side panels 57 and 58 that have outwardly extending, rounded peripheral edges 59 and 60, respectively, welded to the rounded peripheral edges 34 and 35 of the side panels 32 and 33.

A removable panel 61 is mounted between the inner side panels 57 and 58. The removable panel 61 has an upper flange 62 that fits against the rearwardly and downwardly extending flange 53 and a lower flange 63 that cooperates with the lower end 64 of the removable panel 61 to fit against the rearwardly and downwardly extending flange 46, as shown in FIGS. 6 and 8. Rather than being rounded, the removable panel 61 has flat sections 65, 66, 67, and 68 to provide rigidity. The rear edges 69 and 70 of the inner side panels 57 and 58 follow the lines defined by the side edges of the removable panel 61. As shown in FIG. 7, the removable panel 61 has a knob 71 to facilitate its removal and replacement and, as shown in FIGS. 1 and 7, it has a retainer tab 72 welded to it just below the knob 71.

At the lower front of the housing 31, an inclined outlet chute 75 terminates in a lower edge 76 spaced above the upper edge 39 of the rounded front 38 of the bottom panel 37. There are side panels 77 and 78 (See FIGS. 5 and 8.) leading to side flanges 79 and 80 that are welded to the rounded peripheral edges 34 and 35 of the side panels 32 and 33 (See FIG. 2.). A tray 82 is slideable on vertical plates 83 that are welded to the bottom wall 37. The tray 82 is slideable through the slot between the edges 76 and 39, and the tray has a front plate 84 that extends beyond the edges of the slot defined by the edges 76 and 39 to act as a stop.

An inlet chute 88 extends downwardly and forwardly from a rear panel 89. The rear panel 89 extends upwardly from a lower flange 90 and is fastened by metal screws 91 to narrow metal strips 92 that are welded to the inwardly rounded peripheral edges 34 and 35 of the side panels 32 and 33. The chute 88 has side panels 93 and 94 and has a central divider 95 welded to it (See FIGS. 2 and 7).

A removable back panel 98 is fastened by metal screws 99 to the narrow strips 92. The panel 98 has louvers 100 in it for ventilation.

An access panel 104 fits into the upper end of the housing 31 immediately behind the channel member 48. The access panel 104 is removably fastened in place by a pair of bolts 105 (See FIG. 5). which are welded to and project upwardly from the rounded peripheral edges 34 and 35 of the side panels 32 and 33 and onto which hand-knobs 106 are threaded. The access panel 104 has downwardly extending front and rear flanges 107 and 108.

The housing 31 is mounted on rubber or plastic feet 110. As shown in FIG. 5, the feet 110 are fastened to the bottom panel 37 by conventional bolt and nut connections 111.

A heater assembly 115 is shown particularly in FIGS. 9, 10, and 11. The heater assembly 115 comprises a steel plate 116 welded to a stainless steel grill plate 117. The stainless steel grill plate 117 has a curved upper end 118 and an inwardly bent lower end 119. Although the grill plate 117 is shown extending across the front of the steel plate 116, it may alternatively constitute upper and lower sections welded to the plate 116 with the joints polished smooth, in which case the steel plate 116 would function directly as the grill plate. An aluminum casting 120 is held against the steel plate 116 by three electrically conductive straps 121 to which four crossbars 122 are welded. The straps 121 and crossbars 122 are secured to the cast iron plate 116 by bolts 123. To avoid sticking of buns to the grill during the operation, which will be described hereinafter, the aluminum casting 120 is designed to supply less heat toward the upper end of the grill plate 117 (or steel plate 116) and to supply gradually increasing quantities of heat toward the lower end of the grill plate 117 (or steel plate 116). To supply this graduated heat, the aluminum casting 120 has a combination of the irregular shape illustrated in FIG. 9, with differently shaped openings 124, and with recessed portions 125 (shown shaded in FIG. 25). This leaves only the raised (or nonrecessed) portions 126 to contact the steel plate 116. The shape of the aluminum casting 120 and the shapes and locations of the openings 124 and recesses 125 may be varied from what is illustrated so long as their combined effect produces the desired pattern of heat distribution already described.

Heat is generated by current delivered through conductors 127 that are connected to conductive strips 128 and 129. The conductive strips 128 and 129 are electrically connected to the vertical conductive strips 121 by the conductive bolts 130 that connect the strips 128 and 129 to the vertical strips 121. There are insulating sleeves 131 on the strips 128 and 129 as shown in FIG. 9. There may be additional bolts 132 for directly connecting the aluminum casting 120 to the cast iron plate 116. A cover 134 is connected over the heated portions of the heater assembly 115 by a pair of bolts 135 threaded into the cast iron plate 116.

The heating assembly 115 is supported between irregularly shaped aluminum castings 138 (See FIGS. 5 and 6) that are fastened by suitable bolts (not shown) to the side panels 32 and 33. The castings 138 are for strength at the connecting points, and their shapes are determined only by the locations of those connecting points. The heating assembly 115 is connected to the irregularly shaped aluminum castings 138 by bolts that are threaded into the cast iron plate 116 and extend through aluminum spacer dowels 140, as shown in FIG. 14. These bolts that are extended within the spacer dowels 140 also support stainless steel lateral guide plates 141 that extend upwardly from opposite sides of the heating assembly 115 (See FIGS. 5 and 8).

Two steel channel members 145 and 146 are welded to spacer blocks 147 that extend from the side castings 138. The channel members 145 and 146 are inclined parallel to one another and at an angle as illustrated in FIG. 5. A block 148 is locked by a pin within the lower end of each channel member 145 and 146, as illustrated in FIG. 21. Each block 148 has a rounded upper end 150.

The channels 146 support a conveyor assembly 154 between them. As shown in FIGS. 15, 16, 17, and 18, the conveyor assembly 154 comprises sideplates 155 and 156 which may be aluminum castings. The sideplates 155 and 156 are held together by crossbars 157 and 158 fastened to the plates 155 and 156 by bolts 159. An upper shaft 161 is journaled in bearings 162 that are mounted in the sideplates 155 and 156. A lower shaft 163 is rotatably journaled in bearings 164 that are mounted in the sideplates 155 and 156. One end 165 of the lower shaft 163 is extended beyond the sideplate 155, as shown in FIG. 19.

Two relatively larger gears 166 and 167 and two relatively smaller gears 168 and 169 are mounted on the upper shaft 161. Two gears 170 and 171 of the same size and pitch as the gears 166 and 167 and two gears 172 and 173 of the same size and pitch as the gears 168 and 169 are mounted on the lower shaft 163. A chain assembly 175 is mounted on and is meshed with the gears 166, 167, 170, and 171, and a chain assembly 176 is mounted on and meshed with the gears 168, 169, 172, and 173. Each chain assembly 175 and 176 comprises a plurality of elongated chain elements 177 shown particularly in FIGS. 22, 23 and 24. Each chain element 177 has a rod 178, each end of which is formed with a downward bend 179 leading to a hook portion 180 that extends around the next rod 178 adjacent the hook portion 179 of that next rod. The result is a continuous chain conveyor 175 mounted with the rods 178 meshed with the teeth of the gears 166, 167, 170 and 171, as illustrated in FIG. 18, and a continuous chain conveyor 176 mounted with its rods 178 in mesh with the gears 168, 169, 172, and 173. As shown in FIGS. 15, 19 and 20, a gear 182 is mounted on the extension 165 of the shaft 163.

The chain conveyors 175 and 176 are somewhat slack for a purpose to be described. For example, if the distance between the shafts 161 and 163 is 13 inches, the span therebetween of each chain conveyor may have between three-fourth inch and 1 inch of slack freedom of movement toward and away from the grill plate.

Each sideplate 155 and 156 has upper and lower horizontally extending slots 184 and 185. A pin 186 is positioned within each slot 184 and 185. Each pin 186 is mounted on a bolt 187 that is rotatably mounted in the plate 155 (and 156) and threaded through the pin 186. Each bolt 187 has heads 188 on both its ends.

The entire conveyor assembly 154 is removably received within the housing 31, with the pins 186 positioned within the channels 145 and 146. The lowermost pins 186 rest against the recesses 150 in the blocks 148 at the bottoms of the channels 145 and 146.

As shown in FIGS. 5, 6 and 7, a bracket 192 that is fastened to the side casting 138 by bolts 193 supports an electric motor 194. The motor 194 has an output shaft 195 on which a pair of sprocket gears 196 and 197 are mounted. Another shaft 199 is rotatably journaled in a bearing (not shown) mounted in the aluminum side casting 138. The shaft 199 supports a sprocket wheel 200 and a spur gear 201. A sprocket chain 202 is engaged by the sprocket wheels 196 and 200 so that operation of the motor 194 rotates the sprocket wheel 200 and the spur gear 201. When the conveyor assembly 154 is in position as shown in FIG. 6, the spur gear 201 meshes with the gear 182.

The motor 194 is supplied with electrical power through conventional cords 205 that are connected through an on-off switch 206 mounted on the side panel 203. A dial 207, also mounted on the side panel 33, adjusts the amount of heat produced by the heater assembly 115 for light to dark toasting.

At the upper left front corner of the housing 31, as particularly shown in FIG. 12, a short shaft 209 is rotatably journaled in a bearing 210. A sprocket wheel 211 is mounted on the shaft 209. A sleeve 212 is slideably mounted on the shaft 209, with a pin 213 that is threaded into the shaft 209 being located within a slot 214 in the sleeve 212. A compression spring 215 biases the sleeve 212 away from the shaft 209. The sleeve 212 has a bevelled opening 216 in its outer end.

At the upper right front corner of the housing 31, a bearing block 218 is fastened to the casting 138 by a bolt 219 (See FIG. 13). The bearing block 218 has a bevelled recess 220 in its outer end. The bearing block 218 projects through the hole 221 in the wall 58.

As shown in FIGS. 1, 2, 6, and 7, a butter roll assembly 224 comprises a pan 225 and a roll 226. The pan 225 has a curved bottom 227 and a front lip 228. A rear flange 229 fits under the tab 72 as shown in FIG. 7 to position the pan 225. The pan 225 also has sides 231 and 232.

The roller 226 is affixed by radial plates 234 to a shaft 235. The shaft 235 has tapered ends 236 and 237 that are received in the bevelled recesses 216 and 220, respectively, of the sleeve 212 and the bearing block 218, as shown in FIGS. 12 and 13. The compression spring 215 biases the sleeve 212 against the bevelled end 236 of the shaft 235 so that, as the gear 211 rotates, the shaft 235 and the drum 226 will rotate, with the other bevelled end 237 sliding within the bevelled recess 220 of the bearing block 218. As shown in FIG. 5, a sprocket chain 239 is wrapped about the sprocket wheels 197 and 211 so that, when the motor 194 operates, rotation of the sprocket wheel 197 causes the sprocket wheel 211 to rotate.

OPERATION

This bun grill is very easy to operate. The operator simply flicks the switch 206 to the "on" position. This energizes the motor 194 to operate, producing rotation of its output shaft 195. When the output shaft 195 of the motor 194 operates, both the sprocket wheels 196 and 197 rotate. Rotation of the sprocket wheel 196 drives the sprocket chain 202 to rotate the sprocket wheel 200 and the gear 201. Rotation of the gear 201 rotates the gear 182 to rotate the shaft 163 and the sprocket wheels 170, 171, 172, and 173 which are connected to it. Hence, the conveyors 175 and 176 are immediately driven in a clockwise direction as viewed in FIG. 6. Simultaneously, rotation of the sprocket wheel 197 drives the sprocket chain 239 to rotate the sprocket wheel 211. As shown in FIG. 12, rotation of the sprocket wheel 211 rotates the shaft 209 in the collar 212 to rotate the shaft 235 on which the butter roll 226 is mounted.

Hamburger buns are introduced into the bun grill 30 by placing them against the inlet chute 88 and releasing them. The bottom halves of the buns are placed on the left side of the divider 93 above the conveyor chain 175, and the top halves of the buns are placed to the right of the divider 95 above the conveyor chain 176. Since the conveyor chain 175 rides on larger diameter sprocket wheels 166, 167, 170, and 171, it is closer to the grill plate 117 and properly spaced therefrom to accommodate the thinner bottom halves of the buns. The conveyor chain 176, being mounted on the smaller diameter sprocket wheels 168, 169, 172, and 173, is further from the bun grill 117 to accommodate the thicker top halves of the buns. In both cases, the sides of the chain conveyors 175 and 176 nearest the grill plate 117 hold the bun halves against the grill plate 117 and convey them at the speed of movement of the chain conveyors 175 and 176 from the upper end of the grill plate 117 to the lower end thereof. The chain conveyors 175 and 176 are purposely slack so that they will apply their weight against the bun halves to hold the bun halves in position. Since the conveyor assembly 154 is inclined rather than being absolutely vertical, this slack-chain load against the bun halves is possible.

As the bun halves first contact the upper portion of the grill plate 117, they are lightly heated; and, as they are conveyed downwardly, the heat intensity increases because of the design of the aluminum casting 116. This graduated heat avoids initial sticking of the buns to the grill plate 117; and yet, by the time the buns have been conveyed to the lower end of the grill plate 117, they are toasted to the desired degree. The degree of toasting can be adjusted by turning the knob 207.

When the buns have reached the lower end of the grill plate 117, they are released by the chain conveyors 175 and 176. They then fall down the outlet chute 75 into a suitable collecting pan (not shown). Any grease that may have been carried on the grill plate 117 flows to the bottom end of the grill plate 117 and passes through the narrow crack between the lower end 119 of the grill plate 117 upper edge of the outlet chute 75. This grease falls into the collecting pan 82. The collecting pan can be removed for emptying.

The butter roll 226 continuously rotates within the butter pool contained in the butter pan 227. The buns may be buttered either before or after being grilled. Buttering is done quickly by holding the bun halves for a few moments against the moving surface of the butter roll 226 while the film of butter is transferred from the butter roll 226 to the bun halves. Since the butter roll 226 is motor driven and is constantly rotating, it always carries a substantially uniform thickness of butter on its surface, permitting controlled application of butter to the buns.

In the foregoing manner, continuous grilling and buttering of hamburger buns can continue in a bun grill that occupies a minimum area of counter space.

The slideable rods 186 can be adjusted by rotating the bolts 187 to adjust the spacing between the chain conveyors 175 and 176 and the grill plate 117. Since the rods 186 are positioned within the tracks 145 and 146, rotation of the bolts 187 in one direction moves the chain conveyors 175 and 176 toward the grill plate 117 and rotation of bolts 187 in the other direction moves the chain conveyors 175 and 176 away from the grill plate 117.

It is easy to clean this bun grill. The entire conveyor assembly 154 can be removed by loosening the knobs 106 to remove the top access panel 104 and then sliding the conveyor assembly 154 upwardly until the rods 186 are freed from the tracks 145 and 146. The butter pan 227 can be removed by rotating it free of the tab 72. This exposes the panel 61 for removal by grasping the knob 71. When the conveyor assembly 154 is replaced, its rods 186 are introduced into the channels 145 and 146. The gears 182 and 201 automatically mesh when the conveyor assembly 154 is in position.

What is claimed is:

1. A bun grill comprising a housing, a grill plate supported within the housing, means to heat the grill plate, a conveyor assembly for conveying buns past and in contact with the grill plate, the grill plate and the conveyor assembly being supported in inclined planes, means to introduce bun halves into the housing for being conveyed by the conveyor assembly, means to discharge the bun halves from the housing, the means to introduce bun halves comprising an inlet chute adjacent the upper end of the housing, and the means to discharge the bun halves comprising an outlet chute adjacent the lower end of the housing, the conveyor assembly comprising a flexible chain conveyor that is somewhat slack to press buns against the grill plate, and a pair of channels supported within the housing at the angle of inclination of the conveyor, a plurality of pins projecting laterally from each side of the conveyor, the pins being receivable within the channels to position the conveyor, and means to adjust the locations of the pins relative to the conveyor to adjust the spacing between the conveyor and the grill plate.

2. A bun grill comprising a housing, a motor mounted in said housing, a grill plate supported within the housing, means to heat the grill plate, a conveyor assembly for conveying buns past and in contact with the grill plate, the grill plate and the conveyor assembly being supported in inclined planes, means to introduce bun halves into the housing for being conveyed by the conveyor assembly, means to discharge the bun halves from the housing, the means to introduce bun halves comprising an inlet chute adjacent the upper end of the housing, and the means to discharge the bun halves comprising an outlet chute adjacent the lower end of the housing, the conveyor assembly having a chain conveyor comprising two independent chains, means mounting the chains for being driven by the motor, one chain being closer to the grill plate than the other chain to accommodate different thicknesses of bun halves.

3. The bun grill of claim 2 wherein the chain conveyors are somewhat slack to apply pressure against the bun halves and press the bun halves against the grill plate.

4. A bun grill comprising a housing, a grill plate supported within the housing, means for heating the grill plate, 2 16 an inlet opening in the housing adjacent one side of the grill plate for introducing buns, an outlet opening in the housing adjacent the opposite side of the grill plate for discharging buns, a conveyor supported within the housing in spaced relation to the grill plate, the conveyor comprising an endless flexible member, means to continuously move the flexible member past the grill plate from the side of the grill plate adjacent the inlet opening toward the side of the grill plate adjacent the outlet opening, the conveyor and the grill plate being inclined at an angle of at least 45° from horizontal, said flexible member comprising a chain assembly having a plurality of rods extending laterally of the direction of travel of the flexible member, each rod having hook portions pivotally connecting such rod to an adjacent rod to form an endless series of such connections, a pair of spaced sprocket wheels at each side of the flexible member, the rods being meshed with the sprocket wheels, power means to rotate at least one sprocket wheel, a pair of channels supported within the housing at the angle of inclination of the conveyor, a plurality of pins projecting laterally from each side of the conveyor, said pins being receivable within the channels to position the conveyor, and means to adjust the locations of the pins relative to the conveyor to adjust the spacing between the conveyor and the grill plate.

5. The bun grill of claim 4 wherein the relationship between the spacing between sprocket wheels and the size of the flexible member loop is such that the flexible member is slack toward the grill plate to apply some weight of the flexible member against buns positioned between the flexible member and the grill plate.

6. The bun grill of claim 5 including an inclined panel between the grill plate and the outlet opening for directing buns to the outlet opening, a crack between the grill plate and the inclined panel, and a removable tray supported in the housing below the crack for collecting grease or butter dripping from the grill plate through the crack.

7. A bun grill comprising a housing, a grill plate supported within the housing, means for heating the grill plate, an inlet opening in the housing adjacent one side of the grill plate for introducing buns, an outlet opening in the housing adjacent the opposite side of the grill plate for discharging buns, a conveyor supported within the housing in spaced relation to the grill plate, the conveyor comprising two substantially identical endless flexible members positioned side by side, said flexible members comprising a chain assembly having a plurality of rods extending laterally of the direction of travel of the flexible members, each rod having hook portions pivotally connecting such rod to an adjacent rod to form an endless series of such connections, a pair of spaced sprocket wheels at each side of the flexible members, the rods being meshed with the sprocket wheels, and power means to rotate at least one sprocket wheel, the sprocket wheels carrying one flexible member being of lesser diameters than the sprocket wheels carrying the other flexible member to position one flexible member further from the grill plate than the other flexible member and thereby accommodate the different thicknesses of bun tops and bottoms, means to continuously move the flexible member past the grill plate from the side of the grill plate adjacent the inlet opening toward the side of the grill plate adjacent the outlet opening, the conveyor and the grill plate being inclined at an angle of at least 45° from horizontal.